United States Patent
Swain et al.

(10) Patent No.: US 12,470,518 B2
(45) Date of Patent: Nov. 11, 2025

(54) PHYSICALLY DISTRIBUTED CONTROL PLANE FIREWALLS WITH UNIFIED SOFTWARE VIEW

(71) Applicant: NVIDIA CORPORATION, Santa Clara, CA (US)

(72) Inventors: Jyotirmaya Swain, Bangalore (IN); Padam Krishnani, Bangalore (IN); Swapnil Tapadia, Bangalore (IN); Harshil Jain, Udaipur (IN)

(73) Assignee: NVIDIA CORPORATION, Santa Clara, CA (US)

( * ) Notice: Subject to any disclaimer, the term of this patent is extended or adjusted under 35 U.S.C. 154(b) by 203 days.

(21) Appl. No.: 17/409,540

(22) Filed: Aug. 23, 2021

(65) Prior Publication Data

US 2023/0057698 A1 Feb. 23, 2023

(51) Int. Cl.
*H04L 9/40* (2022.01)
*G06F 12/06* (2006.01)
*G06F 13/40* (2006.01)

(52) U.S. Cl.
CPC ...... *H04L 63/0236* (2013.01); *G06F 12/0646* (2013.01); *G06F 13/4027* (2013.01); *H04L 63/0218* (2013.01); *G06F 2212/1008* (2013.01)

(58) Field of Classification Search
None
See application file for complete search history.

(56) References Cited

U.S. PATENT DOCUMENTS

| | | | | |
|---|---|---|---|---|
| 5,734,847 A | * | 3/1998 | Garbus | G06F 13/4027 710/1 |
| 6,425,023 B1 | * | 7/2002 | Batchelor | G06F 13/4027 710/39 |
| 6,629,157 B1 | * | 9/2003 | Falardeau | G06F 13/4027 710/10 |
| 8,850,098 B2 | * | 9/2014 | Madukkarumukumana | G06F 13/28 710/313 |

(Continued)

OTHER PUBLICATIONS

Tu et al.; Seamless Fail-over for PCIe Switched Networks; 2018; retrieved from the Internet https://dl.acm.org/doi/abs/10.1145/3211890.3211895; pp. 1-11, as printed. (Year: 2018).*

(Continued)

*Primary Examiner* — Michael W Chao
(74) *Attorney, Agent, or Firm* — Squire Patton Boggs LLP; Sarah Mirza (57) ABSTRACT

Various embodiments include techniques for processing transactions via a computer system interconnect with a distributed firewall. The distributed firewall includes separate firewalls for various initiators of transactions and separate firewalls for various targets of those transactions. As a result, transactions proceed, for example, along the shortest path from the initiator to the target, rather than being routed through a centralized firewall. In addition, firewall transactions, for example, may be remapped such that initiators address the initiator firewalls and target firewalls via a unified address space, without having to maintain separate base addresses for each initiator firewall and target firewall. As a result, application programs, for example, can execute transactions with increased performance on a computer system as compared to prior approaches.

20 Claims, 6 Drawing Sheets

(56) References Cited

U.S. PATENT DOCUMENTS

| | | | |
|---|---|---|---|
| 9,747,219 B1* | 8/2017 | Bashari | G06F 13/4068 |
| 10,013,388 B1* | 7/2018 | Wang | G06F 12/4282 |
| 10,608,640 B1* | 3/2020 | Orthner | H03K 19/17736 |
| 10,740,265 B1* | 8/2020 | Xu | G06F 13/4221 |
| 11,074,206 B1* | 7/2021 | Jalal | G06F 13/4045 |
| 11,899,604 B2* | 2/2024 | Markovic | H04L 9/3228 |
| 12,007,892 B2* | 6/2024 | Stabrawa | G06F 9/5016 |
| 2003/0135685 A1* | 7/2003 | Cowan | G06F 13/4027 710/308 |
| 2007/0079044 A1* | 4/2007 | Mandal | G06F 13/404 710/310 |
| 2007/0226795 A1* | 9/2007 | Conti | G06F 21/554 726/22 |
| 2008/0082622 A1* | 4/2008 | Pong | G06F 12/0817 709/212 |
| 2008/0163353 A1* | 7/2008 | Conti | H04L 63/126 711/E12.096 |
| 2008/0163358 A1* | 7/2008 | Conti | G06F 21/74 726/15 |
| 2008/0209099 A1* | 8/2008 | Kloeppner | G06F 13/4022 710/314 |
| 2011/0072246 A1* | 3/2011 | Yamada | G06F 13/4027 712/E9.016 |
| 2014/0122828 A1* | 5/2014 | Kagan | G06F 12/1081 711/E12.059 |
| 2014/0237156 A1* | 8/2014 | Regula | G06F 13/4027 710/314 |
| 2015/0120969 A1* | 4/2015 | He | G06F 3/0611 710/74 |
| 2015/0261709 A1* | 9/2015 | Billi | G06F 13/404 710/316 |
| 2015/0281126 A1* | 10/2015 | Regula | H04L 67/55 709/212 |
| 2015/0293873 A1* | 10/2015 | Shao | G06F 13/404 710/314 |
| 2016/0085684 A1* | 3/2016 | Borikar | G06F 3/0605 711/209 |
| 2016/0154756 A1* | 6/2016 | Dodson | G06F 13/4022 710/316 |
| 2016/0283399 A1* | 9/2016 | Das Sharma | G06F 13/4282 |
| 2017/0286314 A1* | 10/2017 | Shacham | G06F 12/1027 |
| 2018/0189057 A1* | 7/2018 | Werner | G06N 3/084 |
| 2018/0322082 A1* | 11/2018 | Breakstone | G06F 13/28 |
| 2019/0013965 A1* | 1/2019 | Sindhu | H04L 49/10 |
| 2019/0180183 A1* | 6/2019 | Diamant | G06N 3/063 |
| 2019/0236038 A1* | 8/2019 | Choudhary | G06F 13/20 |
| 2019/0364018 A1* | 11/2019 | Mundra | G06F 21/71 |
| 2020/0081858 A1* | 3/2020 | Philmore | G06F 13/4027 |
| 2020/0336337 A1* | 10/2020 | Williams | H04L 49/30 |
| 2021/0334023 A1* | 10/2021 | Lossin | G06F 3/067 |

OTHER PUBLICATIONS

First Office Action received for Chinese Application No. 202210691217.6, dated Jun. 21, 2025, 30 pages.

* cited by examiner

PHYSICALLY DISTRIBUTED CONTROL PLANE FIREWALLS WITH UNIFIED SOFTWARE VIEW

BACKGROUND

Field of the Various Embodiments

Various embodiments relate generally to parallel processing compute architectures and, more specifically, to physically distributed control plane firewalls with unified software view.

Description of the Related Art

A computer system generally includes, among other things, one or more processing units, such as central processing units (CPUs) and/or graphics processing units (CPUs), one or more memory systems, registers, input/output (I/O devices), and/or the like. In operation, the various components of a computer system function as an initiator, as a target, or as both an initiator and a target. When a component functions as an initiator, the component directs a transaction, such as a load operation or a store operation, through an interconnect system and towards another component in the computer system, referred to as the target. In some examples, the initiator may perform a load operation to retrieve one or more data values from memory locations and/or registers included in a target. Similarly, in some examples, the initiator may perform a store operation to store one or more data values to memory locations and/or registers included in a target. The physical path from an initiator to the register configuration space or other control space of a target is referred to herein as a control plane. Typical components that function as initiators include the CPUs and the GPUs. Typical components that function as targets include memory systems, registers, and I/O devices. I/O devices functioning as targets include universal asynchronous receivers/transmitters (UARTs), serial peripheral interfaces (SPIs), Ethernet controllers, and/or the like. Further, a CPU may initiate a transaction that specifies a GPU or another CPU as a target. Similarly, a GPU may initiate a transaction that specifies a CPU or another GPU as a target.

Oftentimes, a computer system that includes multiple initiators and multiple targets may employ a firewall mechanism or, more simply, a firewall for security purposes. A firewall serves as a security system that monitors and controls incoming and outgoing transactions across an interconnect system to ensure that each initiator accesses only the memory address spaces and/or other targets that the initiator is permitted to access. The firewall prevents an application program executing on one initiator from inadvertently or intentionally interfering with an application program executing on another initiator. With a firewall, each transaction generated by an initiator is received by the firewall, and the firewall determines whether the initiator is authorized to direct a transaction towards the memory address space and/or other target specified by the transaction. If the firewall determines that the initiator is not authorized to direct the transaction towards the memory address space and/or other target, then the firewall blocks the transaction. If, on the other hand, the firewall determines that the initiator is authorized to direct the transaction towards the memory address space and/or other target, then the firewall allows the transaction to proceed.

This approach of funneling all transactions to a firewall may work well with small to medium size computer systems. However, some larger computer systems may have hundreds or even thousands of initiators and targets. In such large computer systems, because the firewall processes transactions for hundreds or thousands of initiators, the firewall may become a bottleneck, resulting in reduced bandwidth, increased latency, and reduced compute power, leading to significantly reduced performance of the computer system.

As the foregoing illustrates, what is needed in the art are more effective techniques for implementing a firewall in a computer system.

SUMMARY

Various embodiments of the present disclosure set forth a computer-implemented method for processing a first transaction via an interconnect. The method includes determining that the first transaction is directed at a firewall. The method further includes suspending execution of the first transaction. The method further includes modifying a memory address included in the first transaction and in a first memory address format to generate a modified memory address in a second memory address format. The method further includes transmitting, via the interconnect, the first transaction including the modified memory address to the firewall.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, the firewall is distributed such that each initiator is associated with a separate initiator firewall and each target is associated with a target firewall. Each transaction is routed along a path directly from the initiator firewall associated with the initiator to the target firewall associated with the target. Because transactions are not routed through a centralized firewall, transactions are processed more efficiently relative to prior approaches. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
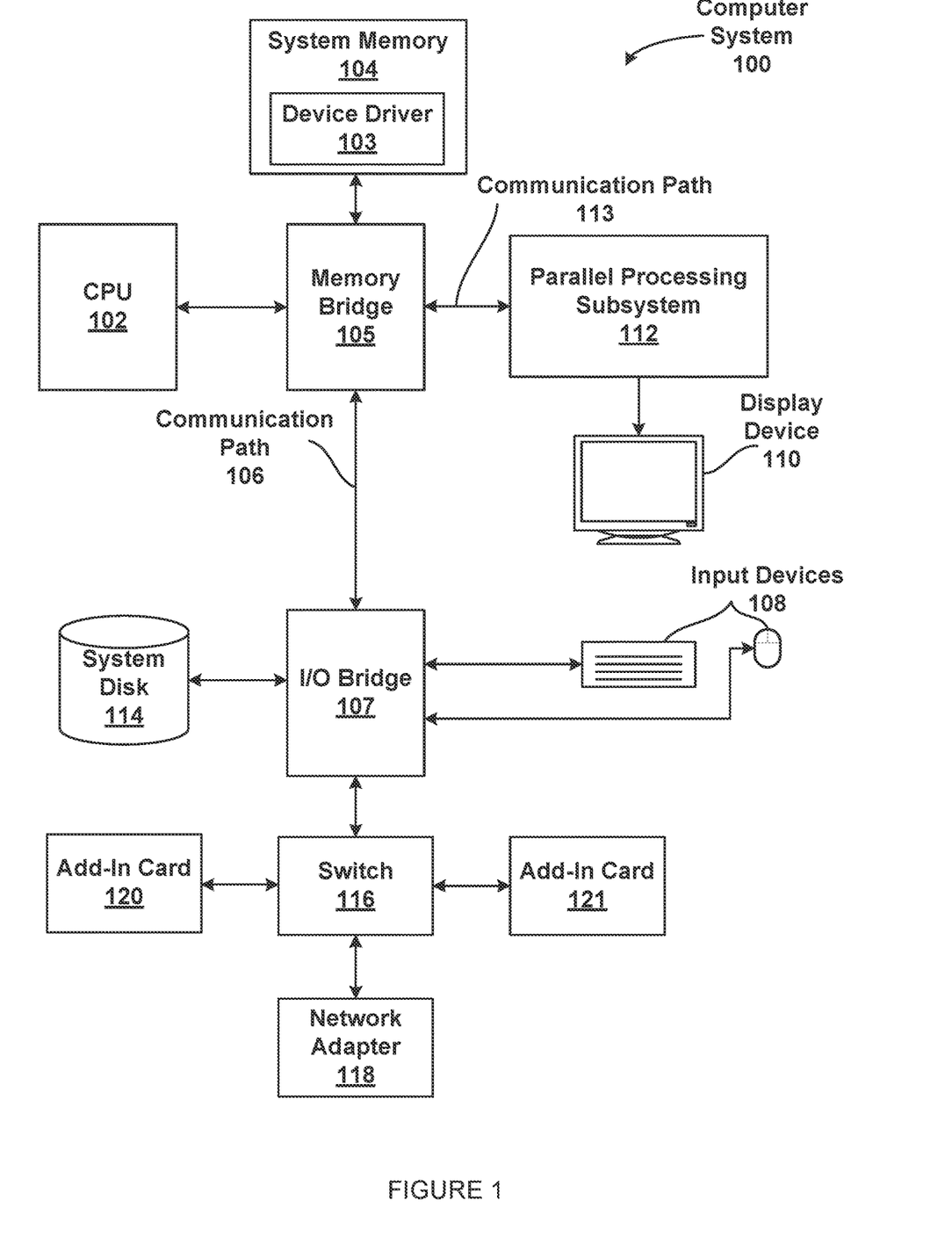
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Physically Distributed Control Plane Firewalls with Unified Software View

Various embodiments include techniques for processing transactions via a computer system interconnect with a distributed firewall. With the disclosed techniques, firewalls are distributed among the initiators and targets in a computer system interconnect. Firewalls with initiator affinity are placed closer to the corresponding initiators. These firewalls, referred to as initiator firewalls, limit transactions from corresponding initiators to be within specified and limited address ranges. Firewalls with target affinity are placed closer to the corresponding targets. Target firewalls limit transactions to allow transactions only from initiators that are authorized to access the corresponding targets. In general, one of the initiators is responsible for configuring the initiator firewalls and target firewalls. Prior to configuration, the initiator firewalls and target firewalls are transparent, passing all transactions through. After the initiator firewalls and target firewalls are configured, the initiator firewalls and target firewalls can detect and either authorize or block accesses from other initiators.

In addition, a firewall remapper performs a mapping function during initialization and configuration of the initiator firewalls and target firewalls. The firewall remapper aids the programming and configuration of the initiator firewalls and target firewalls. The firewall remapper maps the various initiator firewalls and target firewalls in the computer system interconnect to a single unified view. This unified view merges the memory address spaces of the various initiator firewalls and target firewalls into a single address space that includes the memory address spaces of all the initiator firewalls and target firewalls. As a result, the initiator does not need to manage separate address spaces for each initiator firewall and target firewall, but rather accesses all firewalls via a unified view from a software perspective.

Figure 2:
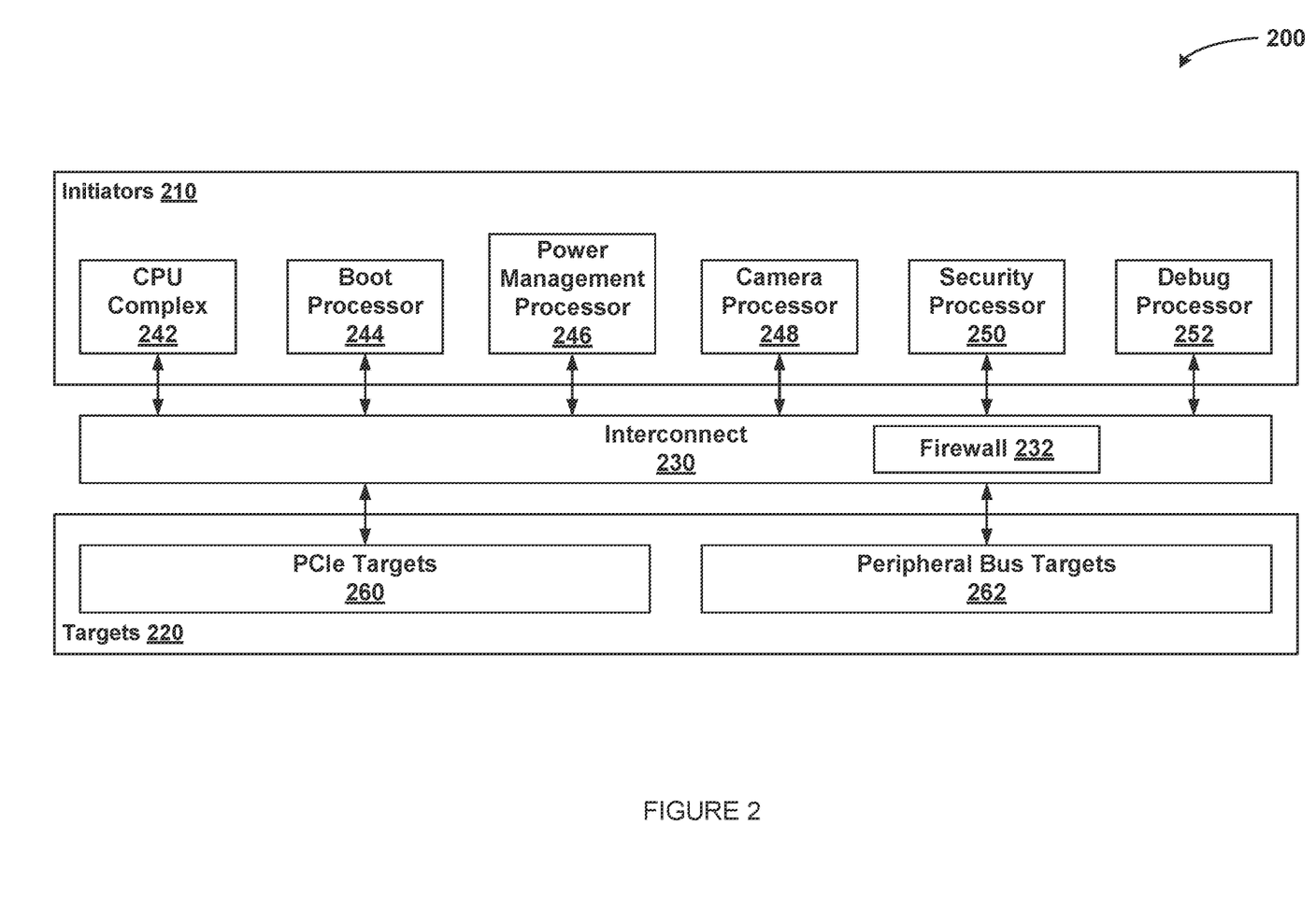
FIG. 2 is a block diagram of a firewall system for the computer system of FIG. 1, according to various embodiments.

FIG. 2 is a block diagram of a firewall system 200 for the computer system 100 of FIG. 1, according to various embodiments. As shown, the firewall system 200 includes, without limitation, initiators 210 and targets 220 that communicate with one another via an interconnect 230. The interconnect 230 is also referred to herein as a "mesh network." The initiators 210 include, without limitation, a CPU complex 242, a boot processor 244, a power management processor 246, a camera processor 248, a security processor 250, and a debug processor 252. The targets include, without limitation, PCIe targets 260 and peripheral bus targets 262.

The CPU complex 242 includes one or more central processing units, such as the CPU 102 of FIG. 1. In some embodiments, the CPU complex 242 may further include one or more parallel processors, such as the parallel processing subsystem 112 of FIG. 1. In operation, the CPUs 102, parallel processing subsystems 112, and/or other processors included in the CPU complex 242 execute operating systems, user-level application programs, and/or other executable software applications.

In operation, the boot processor 244 executes a boot sequence that includes various functions to initialize the firewall system 200 when the firewall system 200 is powered up and/or reset. The boot sequence executed by the boot processor 244 may include functions for initializing memory, configuring various targets 220, loading and executing one or more operating systems and/or hypervisors, and/or the like. Upon completing the boot sequence, the boot processor 244 may notify the CPUs 102, parallel processing subsystems 112, and/or other processors included in the CPU complex 242 that the boot sequence is complete, and execution of application programs may begin.

The power management processor 246 monitors activity of the other components of the firewall system 200. The power management processor 246 controls various power gating control signals configured to supply or remove power to various components of the firewall system 200. If a particular component, whether an initiator 210 or a target 220, remains idle for a period of time, then the power management processor 246 changes a level of a corresponding power gating control signal in order to remove power to the particular component. The component, in response, transitions from a powered-up state to a powered-down state. Subsequently, if the power management processor 246 determines that a component in a powered-down state is needed to support operations within the firewall system 200, then the power management processor 246 changes a level of a corresponding power gating control signal in order to apply power to the particular component. The component, in response, transitions from a powered-down state to a powered-up state. Additionally or alternatively, the power management processor 246 may supply control signals to gate, or remove, clock signals to various idle components to reduce power consumption. In this manner, the power management processor 246 reduces the power consumption of the firewall system 200 when one or more components are idle.

The camera processor 248 receives image data from still image cameras and/or video cameras (not shown). In general, image data may be large in size and may involve significant pre-processing. Therefore, the firewall system 200 includes a separate camera processor 248 that retrieves and processes this image data. As a result, the CPUs 102, parallel processing subsystems 112, and/or other processors included in the CPU complex 242 are freed up to perform other tasks.

The security processor 250 performs various security functions to detect malware, software viruses, memory leaks, and application programs that are otherwise exhibit suspicious behavior. The security processor 250 isolates such application programs and/or the processor(s) executing the application programs in order to mitigate any damage that may be caused by the application programs.

The debug processor 252 supports software development by providing a debug and trace function for the CPUs 102, parallel processing subsystems 112, and/or other processors included in the CPU complex 242. The debug processor 252 may set a trap to stop execution of an application program under certain conditions or upon detecting a breakpoint placed in the application program. The debug processor 252 may generate a trace that includes the state of the processor executing the application program. The debug processor 252 may allow the software developer to modify the state of the processor prior to resuming execution. The debug processor may further allow the application program to execute one instruction at a time, and then stop after each instruction. These functions enable the software developer to monitor the behavior of the application program and facilitate debugging of the application program.

The CPU complex 242, a boot processor 244, a power management processor 246, a camera processor 248, a security processor 250, a debug processor 252, and/or other initiators 210 communicate with the various targets 220 via the interconnect 230. The targets include PCIe targets 260 and peripheral bus targets 262.

The PCIe targets 260 include components of the firewall system 200 that communicate with initiators 210 via the peripheral component interconnect express (PCIe) bus standard. The PCIe targets 260 may include, without limitation, auxiliary graphics processors, audio/sound processors, display processors, and/or the like.

The peripheral bus targets 262 include components of the firewall system 200 that communicate with initiators 210 via any technically feasible communications channels other than the PCIe bus standard. The peripheral bus targets 262 may include, without limitation, memory systems, universal asynchronous receivers/transmitters (UARTs), serial peripheral interfaces (SPIs), Ethernet controllers, and/or the like.

In order to provide security isolation across application programs executing on various initiators 210 and to mitigate interference from one application program to other application programs, the firewall system 200 may implement a firewall 232. The firewall 232 serves as a security system that monitors and controls incoming and outgoing transactions across the interconnect 230 to ensure that each initiator 210 accesses only the memory address spaces and/or other targets 220 that the initiator 210 is permitted to access. The firewall 232 is deployed within the interconnect 230, in order to avoid dependency and/or interference from the initiators, such as interference due to power gating, clock gating and reset cycles. As a result, the firewall 232 authorizes transactions regardless of the activities of the various initiators 210. In general, the firewall 232 is reset, when needed, by a secure reset signal that is inaccessible to non-secure application programs executing on the initiators 210.

Figure 3A:
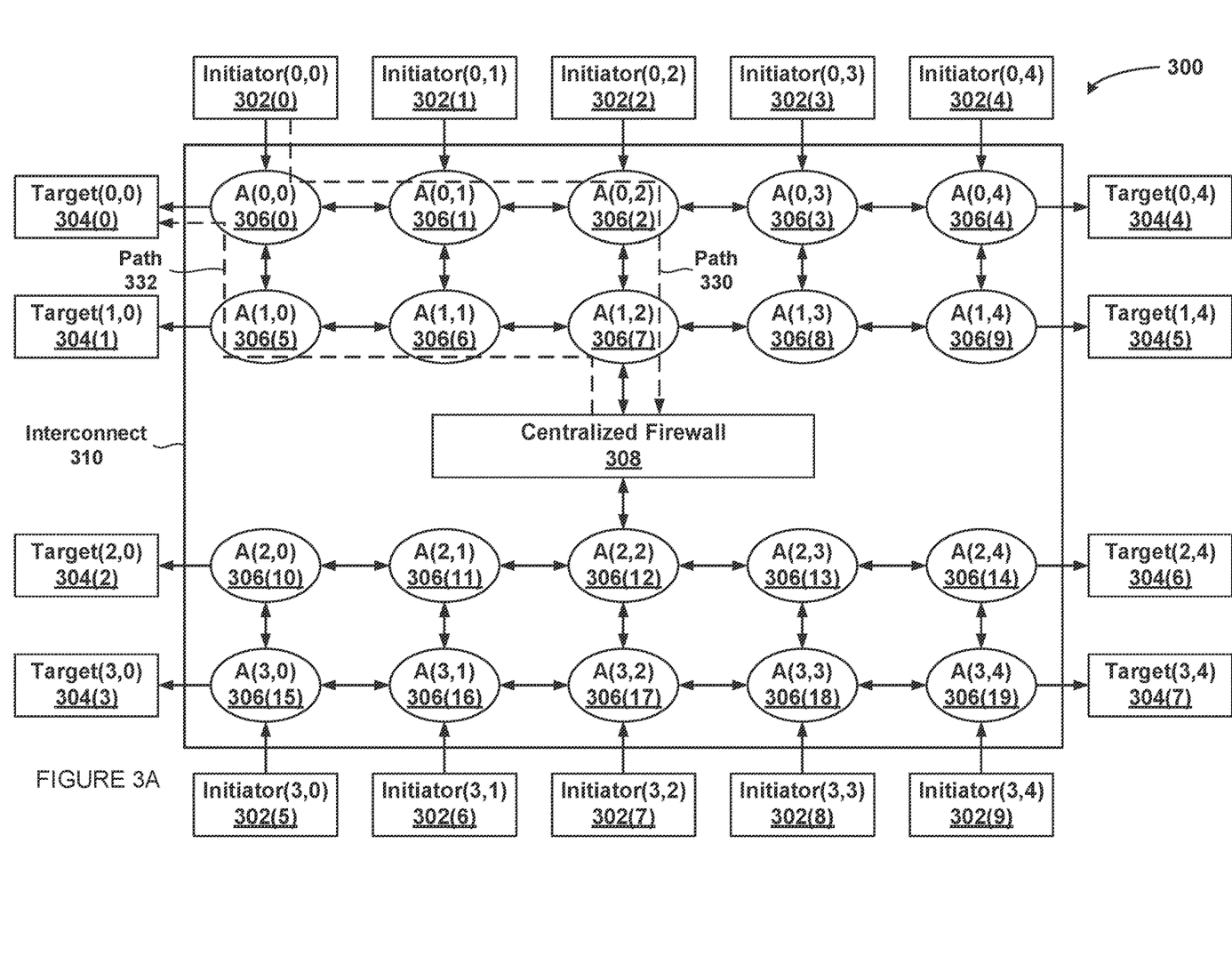
FIG. 3A is a block diagram of a firewall system with a centralized firewall for the computer system of FIG. 1, according to various embodiments.

FIG. 3A is a block diagram of a firewall system 300 with a centralized firewall for the computer system 100 of FIG. 1, according to various embodiments. As shown, the firewall system 300 includes, without limitation, initiators 302 and targets 304 that communicate with one another via an interconnect 310. The interconnect 310 is also referred to herein as a "mesh network." The interconnect 310 includes, without limitation, nodes (A) 306 and a centralized firewall 308.

Certain nodes A 306 in the interconnect 310 are associated with an initiator 302 but not with a target 304. For example, nodes A (0,1) 306(1), A (0,2) 306(2), and A (0,3) 306(3) are associated with initiator (0,1) 302(1), initiator (0,2) 302(2), and initiator (0,3) 302(3), respectively. Similarly, nodes A (3,1) 306(1), A (3,2) 306(2), and A (3,3) 306(1) are associated with initiator (3,1) 302(6), initiator (3,2) 302(7), and initiator (3,3) 302(8), respectively. Certain nodes A 306 in the interconnect 310 are associated with a target 304 but not with an initiator 302. For example, nodes A (1,0) 306(5) and A (2,0) 306(10) are associated with target (1,0) 304(1) and target (2,0) 304(2), respectively. Similarly, nodes A (1,4) 306(9) and A (2,4) 306(14) are associated with target (1,4) 304(5) and target (2,4) 304(6), respectively.

Certain nodes A 306 in the interconnect 310 are associated with both an initiator 302 and a target 304. For example, node A (0,0) 306(0) is associated with both initiator (0,0) 302(0) and target (0,0) 304(0). Node A (0,4) 306(4) is associated with both initiator (0,4) 302(4) and target (0,4) 304(4). Node A (3,0) 306(15) is associated with both initiator (3,0) 302(5) and target (3,0) 304(3). Node A (3,4) 306(19) is associated with both initiator (3,4) 302(9) and target (3,4) 304(7). Certain nodes A 306 in the interconnect 310 interconnect with other nodes 306 and/or the centralized firewall 308 but are not directly associated with any initiators 302 or targets 304. For example, nodes A (1,1) 306(6), A (1,3) 306(8), A (2,1) 306(11), A (2,2) 306(12), and A (2,3) 306(13) interconnect with other nodes 306 but are not directly associated with any initiators 302 or targets 304.

In order to provide security isolation across application programs executing on various initiators 302 and to mitigate interference from one application program to other application programs, all transactions processed by the firewall system 300 pass through the centralized firewall 308. Effectively, all transactions are transmitted by various initiators 302 and merge at the centralized firewall 308. For each transaction, the centralized firewall 308 performs an authorization function to determine whether the initiator 302 is authorized to access the target 304 specified by the transaction. If the centralized firewall 308 determines that the initiator 302 is not authorized to direct the transaction towards the memory address space associated with the target 304, then the centralized firewall 308 blocks the transaction. If, on the other hand, the centralized firewall 308 determines that the initiator 302 is authorized to direct the transaction towards the memory address space associated with the target 304, then the centralized firewall 308 allows the transaction to proceed. Transactions that are authorized by the centralized firewall 308 demerge at the output of the centralized firewall 308 and proceed to the corresponding target 304.

Although a particular initiator 302 may generate transactions for various targets 304 interspersed throughout the firewall system 300, the centralized firewall 308 presents the initiator 302 with a unified software view of the firewalls for the targets in the form of a single address space, independent of the number of firewalls for various targets 304 or of the structure and/or topology of the interconnect 310. With a unified software view, an initiator 302 addresses the firewalls for a given target 304 by adding an offset associated with the firewall for the target 304 to a single firewall base address. For example, to address the firewall for target (0,0) 304(0), the initiator 302 directs the transaction to firewall base address+target firewall offset (0,0). Similarly, to address the firewall for target (2,1) 304(11), the initiator 302 directs the transaction to firewall base address+target firewall offset (2,1), and so on.

In general, one of the initiators is responsible for configuring the firewalls for the targets via the unified software view of the firewalls. Prior to configuration, the firewalls are transparent, passing all transactions through. After the firewalls are configured, the firewalls can detect and either authorize or block accesses from other initiators.

In one particular example, initiator (0,0) 302(0) executes a transaction directed towards target (0,0) 304(0). Even though both the initiator (0,0) 302(0) and the target (0,0) 304(0) are associated with the same node A (0,0) 306(0), the transaction is not allowed to pass directly from the initiator (0,0) 302(0) to the target (0,0) 304(0) via the node A (0,0) 306(0). The transaction travels along path 330 from the initiator (0,0) 302(0) to the centralized firewall 308. In so doing, the transaction travels through nodes A (0,0) 306(0), A (0,1) 306(1), A (0,2) 306(2), and A (1,2) 306(7) prior to reaching the centralized firewall 308. The centralized firewall 308 performs an authorization function to determine whether the initiator (0,0) 302(0) is authorized to access the target (0,0) 304(0) specified by the transaction. If the centralized firewall 308 determines that the initiator (0,0) 302 (0) is not authorized to direct the transaction towards the memory address space associated with the target (0,0) 304(0), then the centralized firewall 308 blocks the transaction. If, on the other hand, the centralized firewall 308 determines that the initiator (0,0) 302(0) is authorized to direct the transaction towards the memory address space associated with the target (0,0) 304(0), then the centralized firewall 308 allows the transaction to proceed along path 332 from the centralized firewall 308 to the target (0,0) 304(0). In so doing, the transaction travels through nodes A (1,2) 306(7), A (1,1) 306(6), A (1,0) 306(5), and A (0,0) 306(0) prior to reaching the target (0,0) 304(0).

The approach described above is reasonably efficient for small interconnects 310. However, this approach does not scale well for larger interconnects 310 for various reasons. First, all transactions through the interconnect 310 merge into the centralized firewall 308, and then demerge after authorization by the centralized firewall 308. Therefore, a significant amount of bandwidth of the interconnect 310 is consumed by transmitting transactions from the initiators 302 to the centralized firewall 308 and from the centralized firewall 308 to the targets 304. Second, transmitting a transaction from an initiator 302 to a target 304 via the centralized firewall 308, such as via path 330 and path 332, increases the latency of the transaction relative to transmitting the transaction directly from the initiator 302 to the target 304. This increased latency leads to reduced performance of the interconnect 310. Third, because all transactions pass through the centralized firewall 308, the utilization of the centralized firewall 308 may become very high, thereby creating a hotspot in the region from a temperature and power consumption point of view. Fourth, because all transactions are routed to and from the centralized firewall 308, the area around the centralized firewall 308 may have a high wire count which, in turn, may result in congestion and routing difficulties during layout. Fifth, the centralized firewall 308 may have difficulty in meeting timing requirements, because the centralized firewall 308 includes the firewalls for all initiators 302 and targets 304. As a result, an interconnect 310 with a centralized firewall 308 is better suited for relatively small firewall systems 300.

Figure 3B:
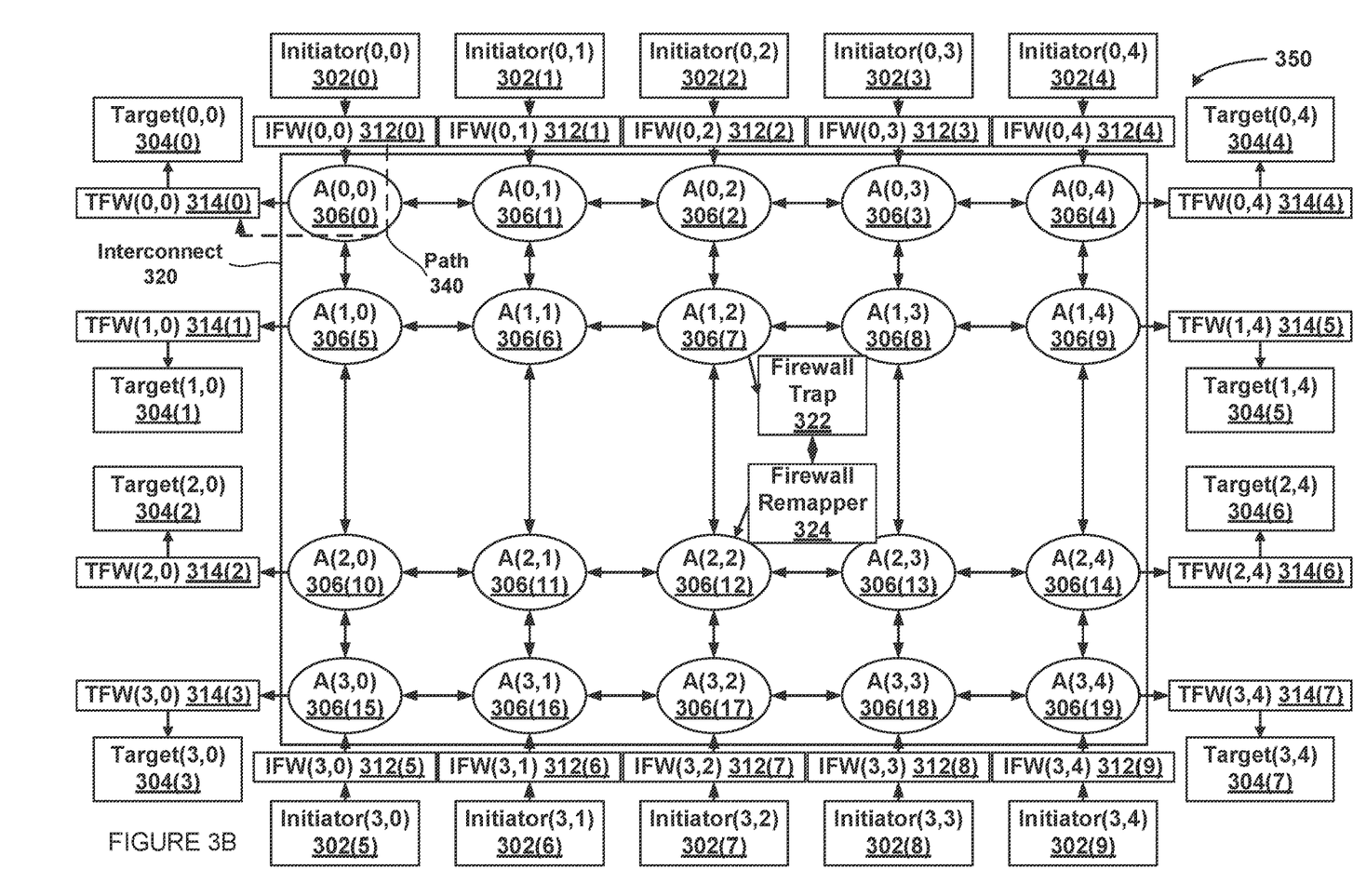
FIG. 3B is a block diagram of a firewall system with a distributed firewall for the computer system of FIG. 1, according to various embodiments.

FIG. 3B is a block diagram of a firewall system 350 with a distributed firewall for the computer system 100 of FIG. 1, according to various embodiments. As shown, the firewall system 350 includes, without limitation, initiators 302, targets 304, initiator firewalls 312, and target firewalls 314 that communicate with one another via an interconnect 320. The interconnect 320 is also referred to herein as a "mesh network." The interconnect 320 includes, without limitation, nodes (A) 306, a firewall trap 322, and a firewall remapper 324. The initiators 302, targets 304, and nodes 306 of the firewall system 350 of FIG. 3B function similarly to the initiators 302, targets 304, and nodes 306 of the firewall system 300 of FIG. 3A excepts as further described below.

With the firewall system 350 of FIG. 3B, the firewalls are distributed through the firewall system 350 rather than being centralized within the interconnect 320. Firewalls with an initiator affinity are referred to as initiator firewalls (IFWs) 312. Initiator firewalls 312 are placed near corresponding initiators 302 and serve to limit, or sandbox, each corresponding initiator 302 to address a limited address range. In some embodiments, multiple initiator firewalls 312 may be merged and placed at a common node 306 in order to sandbox multiple initiators 302.

Each initiator 302 of the firewall system 350 connects to a respective node 306 via a corresponding initiator firewall (IFVV) 312. Initiator (0,0) 302(0), initiator (0,1) 302(1), initiator (0,2) 302(2), initiator (0,3) 302(3), and initiator (0,4) 302(4) connect to nodes A (0,0) 306(0), A (0,1) 306(1), A (0,2) 306(2), A (0,3) 306(3), and A (0,4) 306(4) via IFW (0,0) 312(0), IFW (0,1) 312(1), IFW (0,2) 312(2), IFW (0,3) 312(3), and IFW (0,4) 312(4), respectively. Similarly, initiator (3,0) 302(5), initiator (3,1) 302(6), initiator (3,2) 302(7), initiator (3,3) 302(8), and initiator (3,4) 302(9) connect to nodes A (3,0) 306(15), A (3,1) 306(16), A (3,2) 306(17), A (3,3) 306(18), and A (3,4) 306(19) via IFW (3,0) 312(5), IFW (3,1) 312(6), IFW (3,2) 312(7), IFW (3,3) 312(8), and IFW (3,4) 312(9), respectively.

Firewalls with a target affinity are referred to as target firewalls (TFWs) 314. Target firewalls 314 are placed near corresponding targets 304 protected by the respective target firewalls 314. In some embodiments, a target firewall 314 may protect multiple targets by implementing a firewall for each of the multiple targets protected by the target firewall 314. In such embodiments, the target firewall 314 scales to the number of targets 304 associated with the corresponding node 306 and to the various functions of each target 304.

Each target 304 of the firewall system 350 connects to a respective node 306 via a corresponding target firewall (TFVV) 314. Target (0,0) 304(0), target (1,0) 304(1), target (2,0) 304(2), and target (3,0) 304(3) connect to nodes A (0,0) 306(0), A (1,0) 306(5), A (2,0) 306(10), and A (3,0) 306(3) via TFW (0,0) 314(0), TFW (1,0) 314(1), TFW (2,0) 314(2), and TFW (3,0) 314(3), respectively. Similarly, target (0,4) 304(4), target (1,4) 304(5), target (2,4) 304(6), and target (3,4) 304(7) connect to nodes A (0,4) 306(4), A (1,4) 306(9), A (2,4) 306(14), and A (3,4) 306(19) via TFW (0,4) 314(4), TFW (1,4) 314(5), TFW (2,4) 314(6), and TFW (3,4) 314(7), respectively.

In one particular example, initiator (0,0) 302(0) executes a transaction directed towards target (0,0) 304(0). The IFW (0,0) 312(0) for the initiator (0,0) 302(0) performs an authorization function to determine whether the initiator (0,0) 302(0) is authorized to access the target (0,0) 304(0) specified by the transaction. In doing so, the IFW (0,0) 312(0) for the initiator (0,0) 302(0) checks the memory address specified by the transaction. The IFW (0,0) 312(0) determines whether the initiator (0,0) 302(0) is authorized to direct a transaction towards the memory address space that includes the memory address specified by the transaction. If the IFW (0,0) 312(0) determines that the initiator (0,0) 302(0) is not authorized to direct the transaction towards the memory address space, then the IFW (0,0) 312(0) blocks the transaction. If, on the other hand, the IFW (0,0) 312(0) determines that the initiator (0,0) 302(0) is authorized to direct the transaction towards the memory address space, then the IFW (0,0) 312(0) allows the transaction to proceed.

The transaction is transmitted via the nodes 306 directly from the IFW (0,0) 312(0) for the initiator (0,0) 302(0) to the TFW (0,0) 314(0) for the target (0,0) 304(0). The transaction follows the shortest path from the IFW (0,0) 312(0) for the initiator (0,0) 302(0) to the TFW (0,0) 314(0) for the target (0,0) 304(0). The shortest path may be determined via any technically feasible technique, such as a Manhattan distance technique, a Euclidian distance technique, and/or the like. As shown, the transaction passes along path 340 from the IFW (0,0) 312(0) through nodes A (0,0) 306(0) and then to TFW (0,0) 314(0).

The TFW (0,0) 314(0) performs an authorization function to determine whether the initiator (0,0) 302(0) is authorized to direct a transaction towards the target (0,0) 304(0) protected by the TFW (0,0) 314(0). If the TFW (0,0) 314(0) determines that the initiator (0,0) 302(0) is not authorized to direct a transaction towards the target (0,0) 304(0), then the TFW (0,0) 314(0) blocks the transaction. If, on the other hand, the TFW (0,0) 314(0) determines that the initiator (0,0) 302(0) is authorized to direct a transaction towards the target (0,0) 304(0), then the TFW (0,0) 314(0) allows the transaction to proceed. The TFW (0,0) 314(0) forwards the transaction to the target (0,0) 304(0) for processing.

With distributed firewalls, the firewall system 350 does not merge and demerge transactions at a centralized firewall, such as the centralized firewall 308 of the firewall system 300 of FIG. 3A. As a result, the firewall system 350 does not experience a bottleneck at a single firewall or the latency, hotspot, and congestion issues described in conjunction with FIG. 3A. Each transaction traverses the shortest path from the relevant IFW 312 to the relevant TFW 314. Further, each TFW 314 includes only the firewalls for the particular targets 304 protected by that TFW 314. As a result, the timing problems described in conjunction with FIG. 3A are reduced and/or eliminated.

With this approach for distributed firewalls, an initiator firewall 312 authorizes transactions from an associated initiator 302. If the transaction is authorized, the initiator firewall 312 transmits the transaction through the nodes 306 of the interconnect 320 to the target firewall 314 via the shortest path through the interconnect 320 without passing through a centralized firewall. The target firewall 314 authorizes the transaction for the associated target 304. If the transaction is authorized, the target firewall 314 forwards the transaction to the associated target 304.

While this approach works well for transactions directed towards most targets, this approach presents a challenge for transactions where the target is one or more of initiator firewalls 312 or the target firewalls 314 themselves, such as when the boot processor 244 initializes and configures the initiator firewalls 312 and the target firewalls 314. During initialization, the boot processor 244 of FIG. 2, or some similar processor, configures the initiator firewalls 312 with the memory address spaces authorized by the associated initiators 302. Similarly, the boot processor 244 configures the target firewalls 314 with the list of initiators 302 that are authorized to transmit transactions to the targets 304 protected by the associated target firewalls 314.

With distributed target firewalls 314, the boot processor 244 directs transactions to various separate initiator firewalls 312 and target firewalls 314, where each initiator firewall 312 and target firewall 314 is associated with a separate address space. Therefore, the boot processor 244 is not presented with a unified software view in the form of a single address space that includes the memory address spaces for all of the initiator firewalls 312 and target firewalls 314. Instead, the boot processor 244 addresses a given initiator firewall 312 or target firewall 314 by adding an offset associated with the initiator firewall 312 or target firewall 314 to a base address of the initiator firewall 312 or target firewall 314. Further, the base addresses of each initiator firewall 312 or target firewall 314 may change with each iteration of the firewall system 350 as the number and address space sizes of the various initiator firewalls 312 and target firewalls 314 change. For example, to address the target firewall (0,0) 314(0), the boot processor 244 directs the transaction to target firewall (0,0) base address+target firewall offset (0,0). Similarly, to address the target firewall (2,1) 304(11), the boot processor 244 directs the transaction to target firewall (2,1) base address+target firewall offset (2,1), and so on. In order to directly address the distributed initiator firewalls 312 and target firewalls 314, the boot processor 244 would have to maintain a list of base addresses for the various initiator firewalls 312 and target firewalls 314. Further, the number and address space sizes for the initiator firewalls 312 and target firewalls 314 are subject to change with iterations of the firewall system 350.

To mitigate this issue, the firewall system 350 includes a firewall trap 322 and a firewall remapper 324. The boot processor 244 addresses the various registers of the initiator firewalls 312 and target firewalls 314 with a unified software view as if the initiator firewalls 312 and target firewalls 314 had a common base address. The memory address generated by the boot processor 244 addresses registers of initiator firewall address spaces and the target firewall address spaces as an offset from a single firewall base address. This form of address is referred to as an initiator-based address.

The firewall trap 322 traps software-initiated transactions directed at initiator firewalls 312 and target firewalls 314 and forwards the access to the correct initiator firewall address space or target firewall address space. In so doing, the firewall trap 322 temporarily suspends execution of the transaction. A transaction that specifies an initiator-based address cannot be sent directly to the initiator firewall 312 or target firewall 314 until the memory address is remapped to an address that specifies an offset from a base address for the relevant target address space. This form of address is referred to as a target-based address. The firewall trap 322 traps the transaction pending the remapping. The firewall trap 322 directs the transaction to a firewall remapper 324 included in the interconnect 320.

The firewall remapper 324 remaps the memory address included in the transaction by modifying the memory address from an initiator-based address to a target-based address. The firewall remapper 324 maintains a lookup table, referred to as a remapping table, that maps the base addresses for the memory address spaces of the various initiator firewalls 312 and target firewalls 314 to a single address space with a single base address, and vice versa. After the firewall remapper 324 remaps the initiator-based address, the remapped address is now in the form of a target-based address.

The remapping table is hard coded in the firewall remapper 324 and may change with iterations of the firewall system 350. However, the changes are transparent to the boot processor 244 and other initiators 302. As a result, the boot processor 244 and other initiators 302 may use the same base address to reference the various initiator firewalls 312 and target firewalls 314, even with iterations of the firewall system 350.

For example, to address the target firewall (0,0) 314(0), the boot processor 244 directs the transaction to firewall base address+target firewall offset (0,0). The firewall remapper 324 remaps this address to an address specified as an offset from the base address for the target firewall 314, such as target firewall (0,0) base address+target firewall offset (0,0). Similarly, to address the target firewall (2,1) 314(11), the boot processor 244 directs the transaction to firewall base address+target firewall offset (2,1). The firewall remapper 324 remaps this address to an address specified as an offset from the base address for the target firewall 314, such as target firewall (2,1) base address+target firewall offset (2,1). The firewall remapper 324 similarly remaps addresses for transactions directed to initiator firewalls 312.

After the firewall remapper 324 remaps the memory address included in the transaction by modifying the memory address from an initiator-based address to a target-based address, the transaction can now be processed to configure the relevant initiator firewall 312 or target firewall 314. Therefore, the firewall trap 322 forwards the transaction to an address space associated with the modified memory address, thereby allowing the transaction to proceed.

Although the firewall remapper 324 may introduce some additional traffic in the firewall system 350, much of this additional traffic occurs only once at boot time, when the boot processor 244 configures the initiator firewalls 312 and the target firewalls 314. Therefore, the firewall remapper 324 introduces little to no impact on the performance of the firewall system 350 during runtime, after the initiator firewalls 312 and the target firewalls 314 are configured. Further, traffic on the firewall system 350 to configure the initiator firewalls 312 and the target firewalls 314 are transmitted only to the relevant initiator firewalls 312 and the target firewalls 314 rather than all initiator firewalls 312 and target firewalls 314. As a result, configuration of the initiator firewalls 312 and target firewalls 314 introduces little to no unnecessary traffic on the firewall system 350.

It will be appreciated that the interconnect shown in FIGS. 2-3B are illustrative and that variations and modifications are possible. In one example, the interconnects of FIGS. 2-3B are shown with a specific number of nodes, initiators, and targets. However, the interconnect may have any technically feasible number of nodes, initiators, and targets, within the scope of the present disclosure. In another example, in the interconnects of FIGS. 2-3B, certain nodes of the interconnect are associated with an initiator firewall, certain nodes are associated with a target firewall, certain nodes are associated with both an initiator firewall and a target firewall, and certain nodes are not associated with either an initiator firewall or a target firewall. However, any node of an interconnect may be associated with an initiator firewall, a target firewall, or both an initiator firewall and a target firewall, within the scope of the present disclosure. In yet another example, the nodes of the interconnects of FIGS. 3A-3B are shown as having certain connections with one another and/or with the firewall. However, the nodes may be interconnected with one another and/or with the firewall in any technically feasible manner and via any technically feasible interconnect structure and/or topology, within the scope of the present disclosure. In yet another example, the initiator firewalls and target firewalls of FIG. 3B are shown as being outside of the interconnect 320 of the firewall system 350. However, the initiator firewalls and target firewalls may be included within the interconnect 320 of the firewall system 350, within the scope of the present disclosure.

Figure 4A:
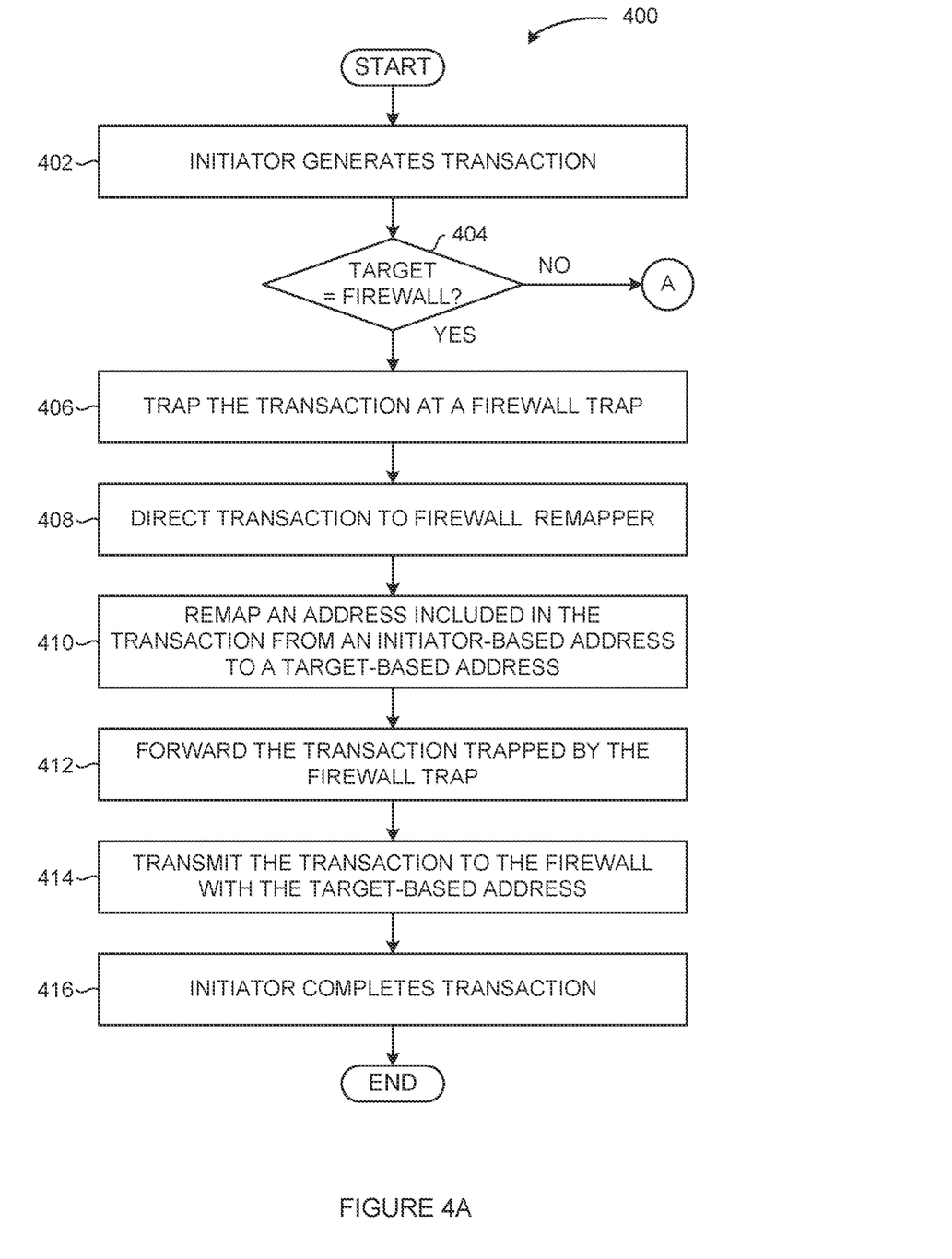
FIGS. 4A-4B set forth a flow diagram of method steps for processing a transaction via the interconnect with the distributed firewall of FIG. 3B, according to various embodiments.
Figure 4B:
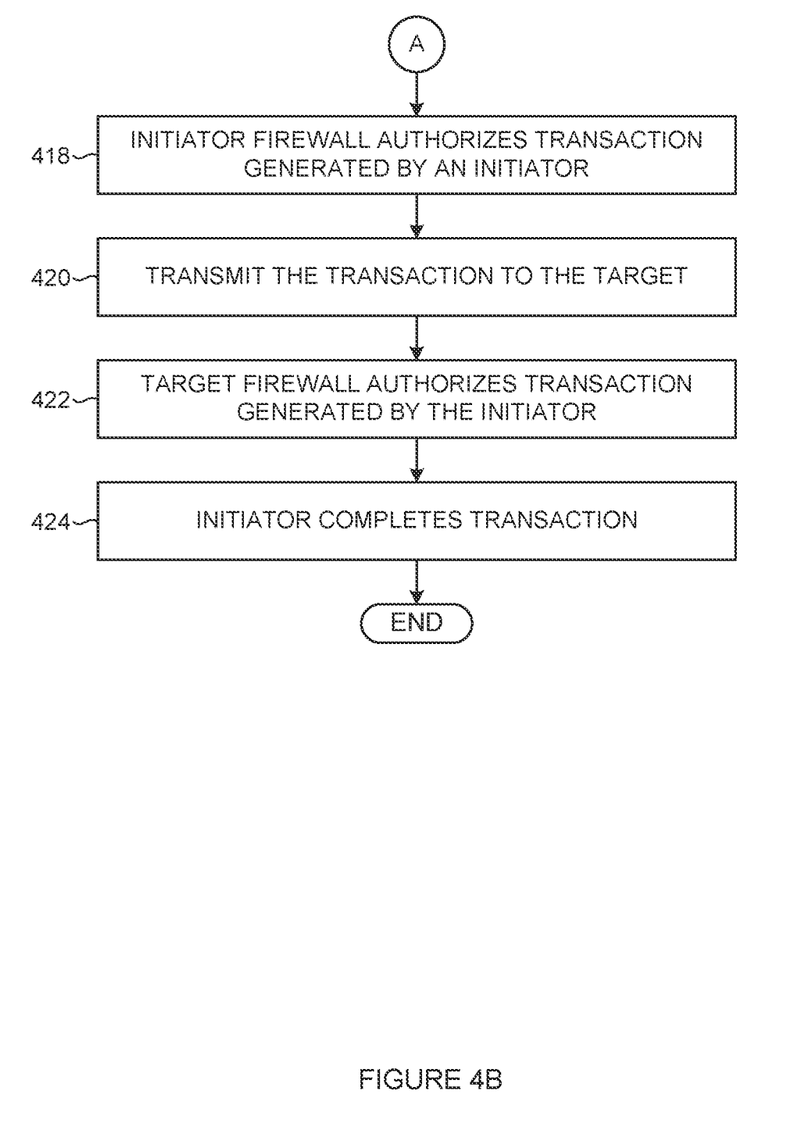

FIGS. 4A-4B set forth a flow diagram of method steps for processing a transaction via the interconnect 320 with the distributed firewall of FIG. 3B, according to various embodiments. Although the method steps are described in conjunction with the systems of FIGS. 1-3B, persons of ordinary skill in the art will understand that any system configured to perform the method steps, in any order, is within the scope of the present disclosure.

As shown, a method 400 begins at step 402, where an initiator 302 issues a transaction. Initiators 302 include any system component that can initiate transactions, such as load operations or store operations, directed at a target. Initiators 302 include, without limitation, a CPU complex 242, a boot processor 244, a power management processor 246, a camera processor 248, a security processor 250, and a debug processor 252. The targets include, without limitation, PCIe targets 260 and peripheral bus targets 262. The initiator 302 executes a transaction directed towards a target 304. In general, an initiator 302 directs a transaction, such as a load operation or a store operation, through the interconnect 320 and towards the target 304. In some examples, the initiator 302 may perform a load operation to retrieve one or more data values from memory locations and/or registers included in the target 304. Similarly, in some examples, the initiator 302 may perform a store operation to store one or more data values to memory locations and/or registers included in the target 304.

At step 404, a firewall trap 322 included in an interconnect 320 determines whether the transaction is directed at an initiator firewall 312 or a target firewall 314. If the firewall trap 322 determines that the transaction is directed at an initiator firewall 312 or a target firewall 314, then the initiator-based address included in the transaction should be remapped to a target-based address. Although the initiator 302 may generate transactions directed towards various targets 304 interspersed throughout the firewall system 350, when the initiator 302 generates a transaction directed towards an initiator firewall 312 or a target firewall 314, as when initializing and configuring the initiator firewalls 312 and the target firewalls 314, the initiator 302 addresses the target address spaces as an offset from a single firewall base address, independent of the number of targets 304 or of the structure and/or topology of the interconnect 310. This form of address is referred to as an initiator-based address. For example, to address the firewall for target (0,0) 304(0), the initiator 302 directs the transaction to firewall base address+target firewall offset (0,0). Similarly, to address the firewall for target (2,1) 304(11), the initiator 302 directs the transaction to firewall base address+target firewall offset (2,1), and so on.

In such cases, the method 400 proceeds to step 406 where the firewall trap 322 traps the transaction. In so doing, the firewall trap 322 temporarily suspends execution of the transaction. A transaction that specifies an initiator-based address cannot be sent directly to the initiator firewall 312 or target firewall 314 until the memory address is remapped to an address that specifies an offset from a base address for the relevant firewall address space. This form of address is referred to as a target-based address. The firewall trap 322 traps the transaction pending the remapping. At step 408, the firewall trap 322 directs the transaction to a firewall remapper 324 included in the interconnect 320.

At step 410, the firewall remapper 324 remaps the memory address included in the transaction by modifying the memory address from an initiator-based address to a target-based address. The firewall remapper 324 maintains a lookup table, referred to as a remapping table, that maps the base addresses for the memory address spaces of the various initiator firewalls 312 and target firewalls 314 to a single address space with a single base address, and vice versa. In this manner, the initiators 302 address the various initiator firewalls 312 and target firewalls 314 with a unified software view as if the initiator firewalls 312 and target firewalls 314 had a common base address. The memory address generated by the initiators 302 addresses the target address spaces as an offset from a single firewall base address. This form of address is referred to as an initiator-based address. After the firewall remapper 324 remaps the initiator-based address, the remapped address now addresses the target address spaces as an offset from a base address for the relevant target address space. This form of address is referred to as a target-based address.

The remapping table is hard coded in the firewall remapper 324 and may change with iterations of the firewall system 350. However, the changes are transparent to the initiators 302. As a result, the initiators 302 may use the same base address to reference the various initiator firewalls 312 and target firewalls 314, even with iterations of the firewall system 350.

For example, to address the firewall for target (0,0) 304(0), the initiator 302 directs the transaction to firewall base address+target firewall offset (0,0). The firewall remapper 324 remaps this address to an address specified as an offset from the base address for the target firewall 314, such as target (0,0) base address+target firewall offset (0,0). Similarly, to address the firewall for target (2,1) 304(11), the initiator 302 directs the transaction to firewall base address+target firewall offset (2,1). The firewall remapper 324 remaps this address to an address specified as an offset from the base address for the target firewall 314, such as target (2,1) base address+target firewall offset (2,1). The firewall remapper 324 similarly remaps addresses for transactions directed to initiator firewalls 312.

At step 412, the firewall trap 322 forwards the transaction to an address space associated with the modified memory address. After the firewall remapper 324 remaps the memory address included in the transaction by modifying the memory address from an initiator-based address to a target-based address, the transaction can now be processed by the relevant initiator firewall 312 or target firewall 314. Therefore, the firewall trap 322 forwards the transaction to an address space associated with the modified memory address, thereby allowing the transaction to proceed.

At step 414, the interconnect 320 transmits the transaction to the initiator firewall 312 or target firewall 314 included in the firewall system 350 that corresponds to the transaction. The interconnect 320 transmits the transaction that now includes the target-based address mapped by the firewall remapper 324 at step 408. The interconnect 320 transmits the transaction via the nodes 306 of the interconnect 320 from the firewall remapper 324 to the target firewall 314 for the target 304.

At step 416, the initiator 302 completes the transaction. The method 400 then terminates. Alternatively, the method 400 proceeds to step 402 to process additional transactions.

Returning to step 404, if the firewall trap 322 determines that the transaction is not directed at a firewall, then the firewall trap 322 does not trap the transaction. Instead, the method 400 proceeds to step 418, where an initiator firewall 312 included in the firewall system 350 authorizes the transaction issued by the initiator 302. The initiator firewall 312, in turn, authorizes the transaction. Firewalls with an initiator affinity are referred to as initiator firewalls 312. Initiator firewalls 312 are placed near corresponding initiators 302 and serve to limit, or sandbox, each corresponding initiator 302 to address a limited address range. In some embodiments, multiple initiator firewalls 312 may be merged and placed at a common node 306 in order to sandbox multiple initiators 302.

The initiator firewall 312 for the initiator 302 performs an authorization function to determine whether the initiator 302 is authorized to access the target 304 specified by the transaction. In so doing, the initiator firewall 312 for the initiator 302 checks the memory address specified by the transaction. The initiator firewall 312 determines whether the initiator 302 is authorized to direct a transaction towards the memory address space that includes the memory address specified by the transaction. If the initiator firewall 312 determines that the initiator 302 is not authorized to direct the transaction towards the memory address space, then the initiator firewall 312 blocks the transaction. If, on the other hand, the initiator firewall 312 determines that the initiator 302 is authorized to direct the transaction towards the memory address space, then the initiator firewall 312 allows the transaction to proceed.

At step 420, the interconnect 320 transmits the transaction to the target firewall 314 included in the firewall system 350 that corresponds to the target 304. The interconnect 320 transmits the transaction via the nodes 306 of the interconnect 320 directly from the initiator firewall 312 for the initiator 302 to the target firewall 314 for the target 304. The transaction follows the shortest path from the initiator firewall 312 for the initiator 302 to the target firewall 314 for the target 304. The shortest path may be determined via any technically feasible technique, such as a Manhattan distance technique, a Euclidian distance technique, and/or the like.

At step 422, the target firewall 314 authorizes the transaction generated by the initiator 302, as described in conjunction with step 416. Firewalls with a target affinity are referred to as target firewalls 314. Target firewalls 314 are placed near corresponding targets 304 protected by the respective target firewalls 314. In some embodiments, a target firewall 314 may protect multiple targets by implementing a firewall for each of the multiple targets protected by the target firewall 314. In such embodiments, the target firewall 314 scales to the number of targets 304 associated with the corresponding node 306 and to the various functions of each target 304.

The target firewall 314 performs an authorization function to determine whether the initiator 302 is authorized to direct a transaction towards the target 304 protected by the target firewall 314. If the target firewall 314 determines that the initiator 302 is not authorized to direct a transaction towards the target 304, then the target firewall 314 blocks the transaction. If, on the other hand, the target firewall 314 determines that the initiator 302 is authorized to direct a transaction towards the target 304, then the target firewall 314 allows the transaction to proceed. The target firewall 314 forwards the transaction to the target 304 for processing.

At step 424, the initiator 302 completes the transaction. The method 400 then terminates. Alternatively, the method 400 proceeds to step 402 to process additional transactions.

In sum, various embodiments include techniques for processing transactions via a computer system interconnect with a distributed firewall. With the disclosed techniques, firewalls are distributed among the initiators and targets in a computer system interconnect. Firewalls with initiator affinity are placed closer to the corresponding initiators. These firewalls, referred to as initiator firewalls, limit transactions from corresponding initiators to be within specified and limited address ranges. Firewalls with target affinity are placed closer to the corresponding targets. Target firewalls limit transactions to allow transactions only from initiators that are authorized to access the corresponding targets. In general, one of the initiators is responsible for configuring the initiator firewalls and target firewalls. Prior to configuration, the initiator firewalls and target firewalls are transparent, passing all transactions through. After the initiator firewalls and target firewalls are configured, the initiator firewalls and target firewalls can detect and either authorize or block accesses from other initiators.

In addition, a firewall remapper performs a mapping function during initialization and configuration of the initiator firewalls and target firewalls. The firewall remapper aids the programming and configuration of the initiator firewalls and target firewalls. The firewall remapper maps the various initiator firewalls and target firewalls in the computer system interconnect to a single unified view. This unified view merges the memory address spaces of the various initiator firewalls and target firewalls into a single address space that includes the memory address spaces of all the initiator firewalls and target firewalls. As a result, the initiator does not need to manage separate address spaces for each initiator firewall and target firewall, but rather accesses all firewalls via a unified view from a software perspective.

At least one technical advantage of the disclosed techniques relative to the prior art is that, with the disclosed techniques, the firewall is distributed such that each initiator is associated with a separate initiator firewall and each target is associated with a target firewall. Each transaction is routed along a path directly from the initiator firewall associated with the initiator to the target firewall associated with the target. Because transactions are not routed through a centralized firewall, transactions are processed more efficiently relative to prior approaches. Another advantage of the disclosed techniques is that transactions are remapped such that the application program executing on an initiator is presented with a unified view of the firewalls regardless of changes in the specific configuration of the interconnect. As a result, the programmer does not need to modify the application program each time the architecture of the interconnect changes. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing a first transaction via an interconnect comprising a two-dimensional mesh network, the method comprising:
   receiving the first transaction from an initiator via a first node included in the two-dimensional mesh network;
   determining that the first transaction is directed at a first firewall;
   suspending execution of the first transaction;
   generating a map that merges memory address spaces of a plurality of firewalls including the first firewall into a unified memory address space that has a single firewall base address for all firewalls included in the plurality of firewalls, wherein each firewall included in the plurality of firewalls is addressed by adding the single firewall base address to an offset that is different for each firewall included in the plurality of firewalls;
   modifying, via the map, a memory address included in the first transaction and in a first memory address format in a memory address space of the first firewall to generate a modified memory address in a second memory address format in the unified memory address space; and
   transmitting, via a second node included in the two-dimensional mesh network, the first transaction including the modified memory address to a target coupled to the first firewall.

2. The computer-implemented method of claim 1, wherein:
   the first firewall comprises an initiator firewall that performs a first authorization function on a second transaction, and
   a second firewall comprising a target firewall performs a second authorization function on the second transaction.

3. The computer-implemented method of claim 2, wherein the first authorization function comprises determining that an initiator associated with the initiator firewall is authorized to direct the second transaction towards a memory address space that includes a second memory address included in the second transaction.

4. The computer-implemented method of claim 2, wherein the second authorization function comprises determining that whether an initiator associated with the initiator firewall is authorized to direct the second transaction towards a target protected by the target firewall.

5. The computer-implemented method of claim 1, further comprising, subsequent to suspending the execution of the first transaction, forwarding the first transaction to a firewall remapper.

6. The computer-implemented method of claim 1, further comprising, subsequent to modifying the memory address included in the first transaction to generate the modified memory address, forwarding the first transaction to an address space associated with the modified memory address.

7. The computer-implemented method of claim 1, wherein the first firewall comprises an initiator firewall and a target firewall, and further comprising:

determining a path between an initiator and at least one of the initiator firewall or the target firewall through a plurality of nodes included in the interconnect; and transmitting the first transaction from the initiator to the at least one of the initiator firewall or the target firewall via the path.

8. The computer-implemented method of claim 1, wherein the first memory address format comprises:

a base address of a firewall address space that includes a plurality of address spaces corresponding to a plurality of firewalls that includes the first firewall; and an offset associated with the first firewall.

9. The computer-implemented method of claim 1, wherein the second memory address format comprises:

a base address of a firewall address space that corresponds to the first firewall; and an offset associated with the first firewall.

10. The computer-implemented method of claim 1, wherein the first firewall comprises an initiator firewall that is configured to perform authorization functions for a plurality of initiators.

11. The computer-implemented method of claim 1, wherein the first firewall comprises a target firewall that is configured to perform authorization functions for a plurality of targets.

12. The computer-implemented method of claim 1, wherein the first firewall comprises an initiator firewall that is coupled to a first node included in a plurality of nodes within the interconnect, and a second firewall comprises a target firewall that is coupled to the first node.

13. The computer-implemented method of claim 1, wherein the first firewall comprises an initiator firewall that is coupled to a first node included in a plurality of nodes within the interconnect, and a second firewall comprises a target firewall that is coupled to a second node included in the plurality of nodes.

14. A system, comprising:

an initiator firewall comprising a first microprocessor executing instructions stored in a first memory;

a target firewall comprising a second microprocessor executing instructions stored in a second memory;

a firewall trap that:

receives a first transaction from an initiator coupled to the initiator firewall via a first node included in a two-dimensional mesh network;

determines that a first transaction is directed at the initiator firewall or the target firewall, and suspends execution of the first transaction;

a firewall remapper that:

generates a map that merges memory address spaces of a plurality of firewalls including the initiator firewall and the target firewall into a unified memory address space that has a single firewall base address for all firewalls included in the plurality of firewalls, wherein each firewall included in the plurality of firewalls is addressed by adding the single firewall base address to an offset that is different for each firewall included in the plurality of firewalls, and modifies, via the map, a memory address included in the first transaction and in a first memory address format in a memory address space of the initiator firewall or the target firewall to generate a modified memory address in a second memory address format in the unified memory address space; and an interconnect comprising a two-dimensional mesh network that transmits, via a second node included in the two-dimensional mesh network, the first transaction including the modified memory address to the initiator coupled to the initiator firewall or a target coupled to the target firewall.

15. The system of claim 14, wherein:

the initiator firewall performs a first authorization function on a second transaction, and the target firewall performs a second authorization function on the second transaction.

16. The system of claim 15, wherein the first authorization function comprises determining that an initiator associated with the initiator firewall is authorized to direct the second transaction towards a memory address space that includes a second memory address included in the second transaction.

17. The system of claim 15, wherein the second authorization function comprises determining that whether an initiator associated with the initiator firewall is authorized to direct the second transaction towards a target protected by the target firewall.

18. The system of claim 14, wherein, subsequent to suspending execution of the first transaction, the firewall trap further forwards the first transaction to the firewall remapper.

19. The system of claim 14, wherein, subsequent to the firewall remapper modifying the memory address included in the first transaction to generate the modified memory address, the firewall trap further forwards the first transaction to an address space associated with the modified memory address.

20. The system of claim 14, wherein the system further comprises an initiator associated with the initiator firewall and a target associated with the target firewall, and wherein the interconnect further:

determines a path between the initiator and the target through a plurality of nodes included in the interconnect; and transmits a second transaction from the initiator to the target via the path.

\* \* \* \* \*